J. W. COOPER.
DOWEL JOINT.
APPLICATION FILED MAR. 29, 1909.
981,385.
Patented Jan. 10, 1911.
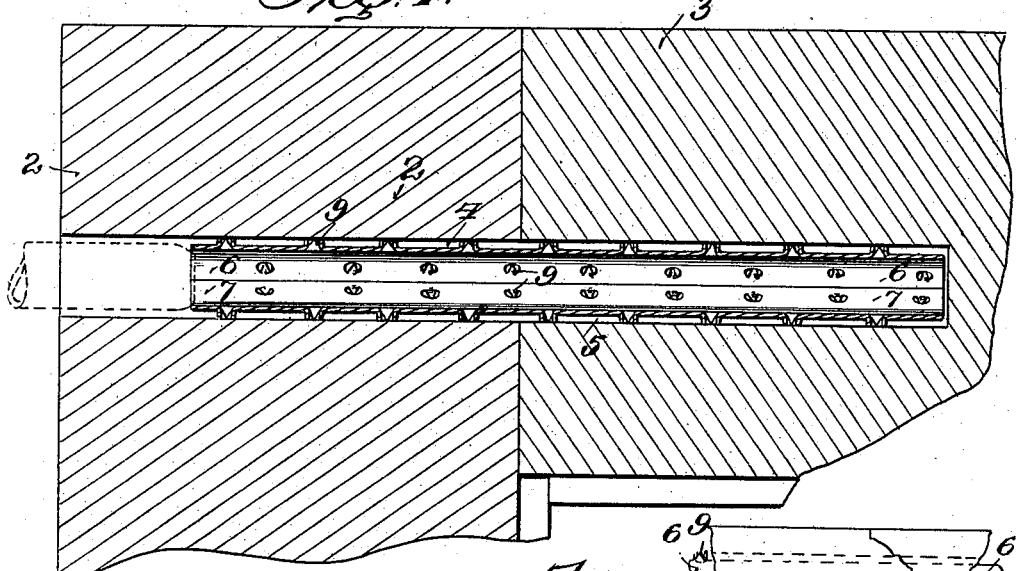
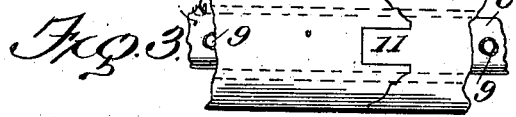
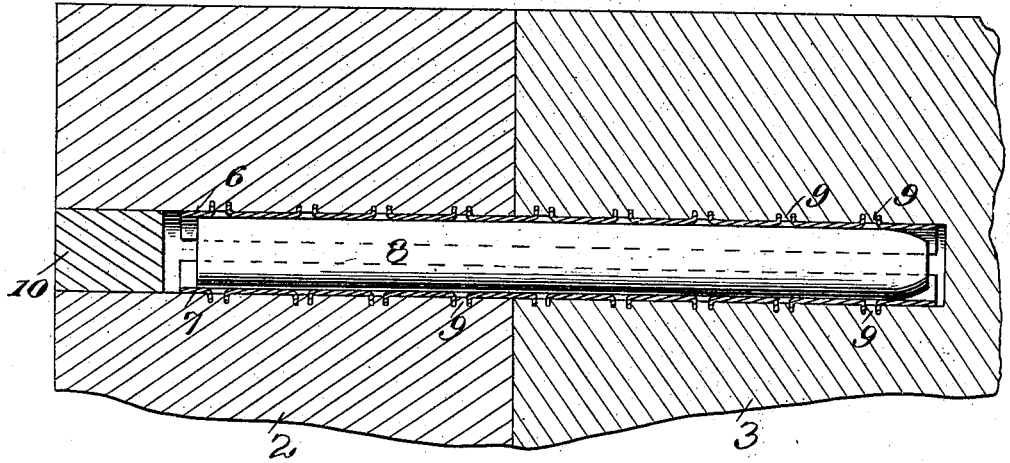
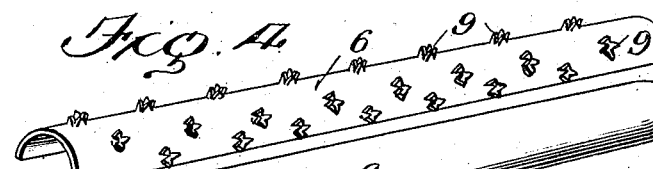
Witnesses
Inventor
John W. Cooper
By
Attorneys.

UNITED STATES PATENT OFFICE.

JOHN W. COOPER, OF BUFFALO, NEW YORK, ASSIGNOR TO THE ENTERPRISE SPECIALTY COMPANY, OF COLUMBUS, OHIO, A CORPORATION.

DOWEL-JOINT.

981,385.    Specification of Letters Patent.    Patented Jan. 10, 1911.

Application filed March 29, 1909. Serial No. 486,536.

*To all whom it may concern:*

Be it known that I, JOHN W. COOPER, citizen of the United States, residing at Buffalo, in the county of Erie and State of New York, have invented certain new and useful Improvements in Dowel-Joints, of which the following is a specification.

My invention relates to woodwork joints, and particularly to a joint for connecting two contacting pieces of timber, the invention consisting broadly in providing the two adjacent pieces of timber with alining passages, inserting a dowel in the alining passages so that the dowel shall project into both pieces of timber, and providing the dowel with an outer sectional sleeve which is formed with outwardly projecting burs, so that when the dowel is driven into position, it will force the sections of the sleeve outward, forcing the burs into the wood of the two pieces of timber, thereby holding the two pieces rigidly together and forming an extremely strong and effective joint.

The drawings show my improved joint as used in connecting two pieces of timber, one running at right angles to the other, and therein: Figure 1 is a section through two contiguous members of a structure, showing the position of my sleeve sections before the insertion of the dowel; Fig. 2 is a like view after the insertion of the dowel; Fig. 3 is a fragmentary end view showing the tongue and groove joint between the two timber members; and, Fig. 4 is a perspective view showing one sleeve section and the tubular dowel.

Corresponding and like parts are referred to in the following description and indicated in all the views of the drawings by the same reference characters.

Referring to the drawings, 2 and 3 designate adjacent pieces of timber, the end of the piece 3 abutting against the edge of the piece 2, the two pieces being bored with alining passages 4 and 5. After the two pieces of timber have been placed in juxtaposition to each other, so that their passages 4 and 5 aline, the two independent sections 6 and 7 of a sleeve, are inserted. These are shown in the perspective view, Fig. 4, and are preferably laterally curved, and have a plurality of perforations made through them. These perforations are made by driving an instrument through from the back or inside face of the sleeve, thus forming a plurality of burs or prongs which project outwardly from the sleeves. After the sections 6 and 7 of the sleeve are in place, the dowel pin 8 is inserted between the sections and is driven down into a position where it extends into both of the pieces of timber, as shown in Fig. 1. This dowel pin being forced down in this manner, forces or expands the section 6 and 7 outwardly, and forces the burs 9 into the wood, thereby practically locking the two pieces of wood to each other against any longitudinal movement and against any movement of rotation around the dowel pin 8 relative to each other. After the dowel pin and the sections 6 and 7 are in place, the passage 4 may be closed, as at 10, by a plug of wood, putty, or other material. While I might form the dowel 8 solid, I prefer to make it of a section of metal tube, as I have found in practice that this gives a joint of maximum strength, yet with a minimum of weight.

While I may form the abutting faces of the timbers 2 and 3 in any desired manner, I preferably form the portion 3 with a tongue 11, and form the edge of the timber 2 with a corresponding groove. It is obvious also that I am not limited to this form of joint. I have found in practice that timbers connected to each other by the joint above described, are very rigidly held in place, and that the timbers do not tend to separate at the joint.

While I do not wish to limit myself to the use of this joint in any particular situation, I may say that in practice I have found it particularly useful in connecting the framing of door or window paneling and the connection of the frames of window sashes.

Having thus described the invention, what is claimed as new is:—

A fastening device comprising separable concavo-convex sections of uniform length and thickness and having their concave faces smooth and unobstructed and their convex faces provided with circumferential upstruck spurs disposed in staggered relation, in combination with abutting sections having registering openings adapted to receive said sections, the circumferential spurs of the concavo-convex sections being adapted to bear against the walls of the openings for centering the sections therein when the longitudinal edges of said sections are disposed in contact with each other, and adapted to be embedded in the walls of the openings when the concavo-convex sections are separated.

In testimony whereof, I affix my signature in presence of two witnesses.

JOHN W. COOPER. [L. S.]

Witnesses:
S. D. DONEY,
G. L. BARNHART.